Feb. 12, 1952     L. FRANKEL     2,585,451
FOOTAGE INDICATOR IN A MOTION-PICTURE CAMERA VIEWER
Filed Oct. 8, 1948     2 SHEETS—SHEET 1
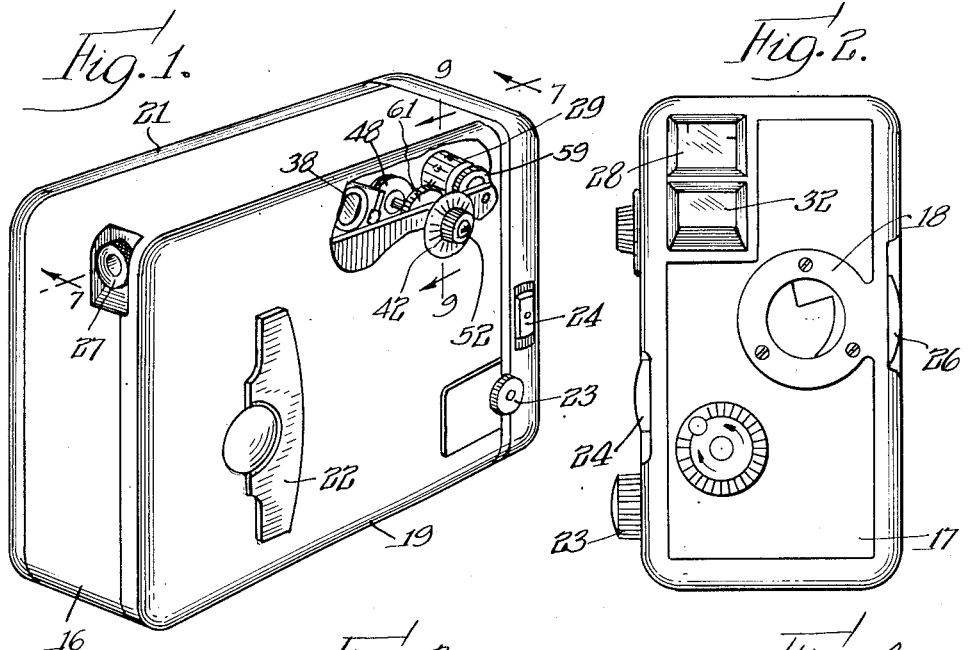
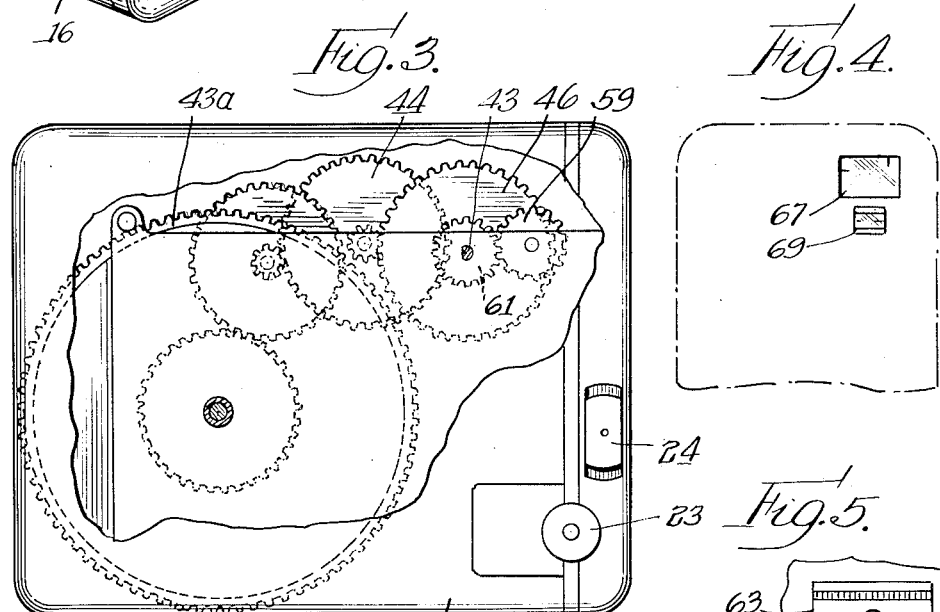
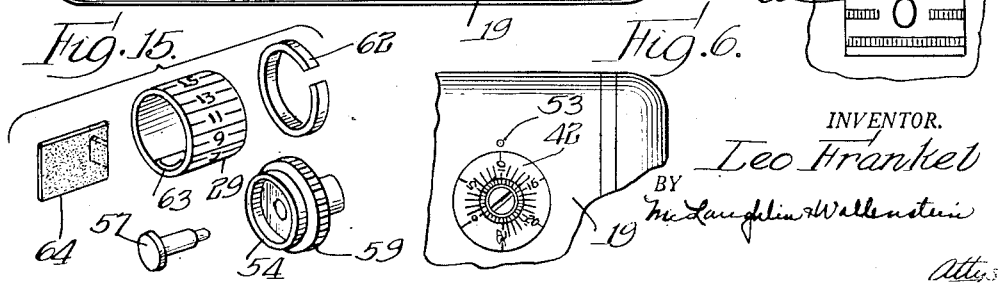
INVENTOR.
Leo Frankel
BY
McLaughlin & Wallenstein
Attys Feb. 12, 1952 — L. FRANKEL — 2,585,451
FOOTAGE INDICATOR IN A MOTION-PICTURE CAMERA VIEWER
Filed Oct. 8, 1948 — 2 SHEETS—SHEET 2
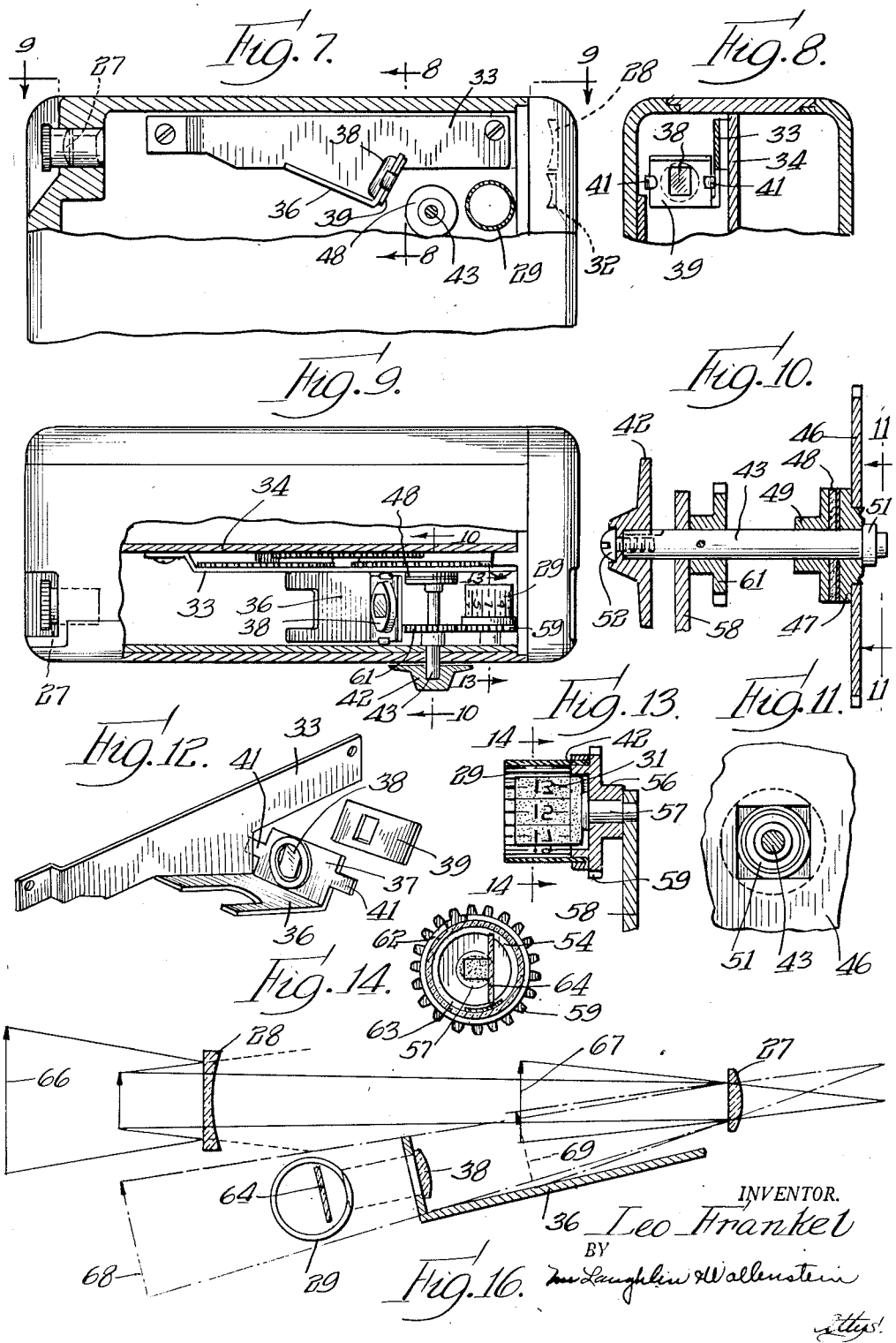
INVENTOR.
Leo Frankel
BY McLaughlin & Wallenstein
Attys.

Patented Feb. 12, 1952

2,585,451

UNITED STATES PATENT OFFICE 2,585,451

FOOTAGE INDICATOR IN A MOTION-PICTURE CAMERA VIEWER

Leo Frankel, Chicago, Ill., assignor, by mesne assignments, to City National Bank and Trust Company of Chicago, as trustee Application October 8, 1948, Serial No. 53,441

3 Claims. (Cl. 88—16)

My invention relates to an improved motion picture camera. It relates more in particular to a novel method of and means for indicating the film "footage," and functions to continuously disclose to an operator during the taking of a picture both the amount of film still available for exposure and the length of film exposed at a given scene.

Broadly, footage indicators on motion picture cameras are very old, and it has also been suggested to locate a footage indicator sufficiently close to a view finder to permit substantially simultaneous examination of the footage indicator and the field being photographed. It is also old to place a footage indicator at a convenient position on the exterior of a camera.

So far as I am aware, however, no one has successfully employed a footage indicator in association with a viewer so that simultaneous inspection of the viewer and footage indicator are possible; nor, so far as I know, has anyone provided a successful arrangement by means of which the proportion of exposed and unexposed film can be determined with the camera in picture-taking position and in a position of being transported, as in the hands.

The principal object of my invention is the provision of an improved motion picture camera; another object is the provision of an improved footage indicator for a motion picture camera; more specific objects of the invention relate to the provision of a footage indicator in which the scene being photographed can be seen simultaneously with the footage indicator without eye accommodation and in which the relative proportion of exposed and unexposed film can also be determined from the exterior of the camera. In accordance with my invention, I provide within the portion of the camera housing the viewer and immediately below the objective lens of the viewer, a drum of translucent material containing indicia indicating footage and supported to be rotated by the camera mechanism as the film is advanced. Sufficient light is admitted to illuminate the face of the counter drum and a lens focused on the exterior surface of the drum closest to the ocular lens of the viewer produces an image of the counter drum which is in the same plane with the final image produced by the viewer lens system. With the eye at the ocular lens, therefore, the image of the scene being photographed and of the counter indicia are in the same plane and may be seen simultaneously without eye accommodation. The counter drum is geared to rotate with a counter of generally conventional type on the exterior of the camera; and, preferably, the drum counter shows the amount of film still to be exposed and the exterior footage indicator shows the amount of film which has been exposed. Means is also provided to adjust both indicators, both with respect to each other and with respect to the film transport mechanism.

Other specific objects and features of the invention will be apparent from a consideration of the following detailed description, taken with the accompanying drawings, in which Fig. 1 is a perspective view with a part of the side wall broken away to illustrate structural features of the footage indicator;

Fig. 2 is a front elevational view of the camera, the lens being removed to simplify the showing;

Fig. 3 is a side elevational view with the case broken away to show the drive for the footage indicator;

Fig. 4 is a schematic view showing the appearance of the viewer and footage indicator when looking through the ocular lens;

Fig. 5 is an enlarged view showing how the indicator appears when a color is employed to indicate the end of the film;

Fig. 6 is a fragmentary elevational view showing the exterior footage indicator;

Fig. 7 is a sectional view taken on line 7—7 of Fig. 1 looking in the direction of the arrows;

Fig. 8 is a transverse sectional view taken on the line 8—8 of Fig. 7 and showing in elevation the specially placed footage indicator lens;

Fig. 9 is a plan sectional view taken on the line 9—9 of Fig. 7, a portion of the top of the camera and the footage indicator drum being shown in plan;

Fig. 10 is an enlarged sectional view taken on the line 10—10 of Fig. 9;

Fig. 11 is a fragmentary sectional view, partly in elevation, taken on the line 11—11 of Fig. 10, looking in the direction of the arrows;

Fig. 12 is a perspective, partly exploded view of a light field and lens assembly;

Fig. 13 is an enlarged sectional view taken on the line 13—13 of Fig. 9;

Fig. 14 is a transverse sectional view taken on line 14—14 of Fig. 13 looking in the direction of the arrows;

Fig. 15 is an exploded perspective view showing the construction of the drum and its support; and Fig. 16 is a sectional view of the lens system with a schematic representative of the optical pattern and showing the manner in which the final images of the view finder and footage indicator are brought into the same plane.

Referring now to the drawings, the embodiment of the invention there shown and the photographic instrument in which it is incorporated are designed for use with an 8 mm. magazine camera in which 25 feet of film are exposed at each side of the magazine; but it will be understood that the features of the invention may be employed with any type of motion picture camera, regardless of width of the film or whether it is mounted on spools or in a magazine. The camera shown comprises a case 16 with a front plate 17, having a lens mount 18, a side 19, and a cover 21, which can be opened to introduce the film. To complete the showing of the camera, although the parts are not primarily concerned with the present invention, I show a winding key 22, speed regulator control 23, camera operating button 24, and a cover latch 26.

The viewer is of conventional type and comprises an ocular lens 27, suitably mounted in the rear wall of the case, and an objective lens 28, set into the front plate 17. There is thus provided the usual relation of objective and ocular lenses, by means of which the final image of the view to be photographed is brought to a focal point for inspection through the ocular lens. Within the viewer cavity and slightly below the objective lens of the viewer, I have placed a transparent rotatable counter drum 29 with numbers 31, in the particular embodiment discussed, running from zero to 25. Immediately below the objective lens in the front plate 17 is a glass window 32 which admits enough light to illuminate the numerals on the counter drum 29. A shield 33 is secured to one of the plates 34, which is part of the spring motor mechanism, and with the contiguous portion of the case 16 forms a closed passageway running from front to rear of the camera and forming a light path between the objective and ocular lenses. An offset portion 36 has an angular portion 37 which acts as a support for a lens 38 and a framing and retaining member 39 (see Fig. 12) is held by the ears 41 to complete the support and assembly of the lens 38. The lens 38 is shaped and positioned to focus on the adjacent surface of the drum 29 and to provide an ultimate image in the same plane as the image formed by the objective lens of the viewer, so that the ocular lens 27 will pick up the viewer image and counter image in the same plane.

As already pointed out, the drum 29 is adapted to be driven by the camera mechanism, and I also provide in association with the drum a footage indicator 42, exterior of the case, which is geared and driven with the drum in a manner, as will be explained, so that one shows the number of feet of film exposed and the other shows the number of feet of film still to be exposed. The indicator 42 is secured on a shaft 43 and this shaft is driven from the main spring by an external gear 43a and gear train indicated generally by the reference character 44. In order to permit adjustment of the footage indicator so that at any time it may be set to zero when a new magazine is introduced, I provide a clutch arrangement, as shown particularly in Figs. 10 and 11.

Gear 46, driven by the gear train 44, is peened to a clutch member 47, which is free to turn on shaft 43 but which is held against a friction face 48 on clutch member 49, secured to shaft 43 by a collar 51, which is also secured to shaft 43. The clutch member 47 is thereby squeezed between the clutch member 49 and the collar 51 to create sufficient friction at the friction member 48, which may be cork or the like, so that in normal operation the gear 46, through the resulting clutch arrangement, will drive shaft 43. The footage indicator 42 slips over the out-of-round, projecting end of shaft 43, and screw 52 threaded into the end of shaft 43 holds it assembled to the shaft. The indicator 42 is conveniently shaped so that it may be grasped and turned to change the position of shaft 43 with respect to gear 46, so that the footage indicator can always be reset in accordance with the actual position of the film. As shown particularly in Fig. 6, a point 53 on the exterior of the case shows where the figure for footage should be read from the indicator 42.

The drum 29 is driven from the shaft 43 and is also adjustable with it and in relation to it, as will be described.

The drum 29 slips over an annular portion 54 of a specially designed hub 56, which is journalled on a stub shaft 57, secured to plate 58 in which the shaft 43 is also journalled. The plate 58 is one of the two plates (the other being 34) which carry the spring motor assembly. The hub 56 also has a gear portion 59 which meshes with and is driven by a gear 61, carried on shaft 43. Gears 59 and 61 are identical so that the drum 29 and indicator 42 will rotate at identical speeds. It is obvious also, in view of this construction, that when the position of the footage indicator 42 is adjusted, the position of the drum 29 will be concomitantly adjusted. The position of the drum 29 is also adjustable with respect to the annular portion 54. This is, primarily, for assembly and construction purposes, but it also provides the means for readjustment in event that for any reason readjustment should be necessary. To hold the drum on its annular portion 54, a spring clamp ring 62 is provided. I also place on the inside of the drum 29 in the position immediately before and including the zero position, a light red or other warning color 63 which may comprise a transparent lacquer, a thin applied sheet of colored plastic or the like. I also preferably place within the drum a slightly opaque or frosted light barrier 64, which may comprise a slightly opaque plastic and which is suitably adhesively secured to the head of the stub shaft 57. The color 63 shows up in the manner indicated in Fig. 5 as a warning that the end of the film is about to be reached or has been reached.

The functioning of the device is indicated by the diagrammatic portion of Fig. 16. For convenience, this figure is reversed, as contrasted with Figs 1, 7, and 9, but the ocular lens 27, objective lens 28, lens 38, and drum 29, bear the same reference numerals and occupy the same relative positions which they do in the preceding figures. In this figure, the numeral 66 indicates the scene to be photographed and the numeral 67 is a point of final image of such scene. The numeral 68 indicates the point of intermediate image and the numeral 69, point of final image on that face of the drum which indicates footage. As the figure shows, the eye, when placed at the ocular lens 27, can see at the same time both the scene to be photographed and the figures representing footage without the need for accommodation. Moreover, since the two objectives are seen at the same time, the number of feet of film exposed in taking a motion picture of any particular scene is readily determined. The approximate images are indicated in Fig. 4; and, as there shown, the footage indicator is immediately below the image of the viewer. For convenience, I have given these two views the same numerals, 67 and 69, which have been employed in Fig. 16. It will be understood, therefore, that if, for example, the numeral 20 appears in the footage indicator associated with the viewer, that is, on the drum 29 the numeral 5 will appear on the external indicator 42. The indicator 42 in other words, shows that 5 feet of film have been exposed, while the indicator, comprising the drum 29, shows that 20 feet of film still remain to be exposed.

As pointed out hereinabove, the invention may take various forms, but has been explained in detail by reference to a preferred embodiment. The scope of the invention is defined in the claims.

What I claim as new and desire to protect by Letters Patent of the United States is:

1. In a motion picture camera, a viewer having an ocular lens and an objective lens forming a final image of a scene to be photographed, a movable counter comprising a translucent drum having indicia showing film footage, means for rotating said drum in synchronism with a film, and a separate lens focused at a point on said drum and serving to produce an image of said indicia as they rotate with said drum, said last-mentioned image being in the same plane as the final image of the viewer, so that both images may be seen simultaneously through the ocular lens without eye accommodation.

2. In a motion picture camera, a viewer having an ocular lens and an objective lens forming a final image of a scene to be photographed, a movable counter comprising a translucent drum having indicia showing film footage, means for rotating said drum in synchronism with a film, a separate lens focused at a point on said drum and serving to produce an image of said indicia as they rotate with said drum, said last-mentioned image being in the same plane as the final image of the viewer, so that both images may be seen simultaneously through the ocular lens without eye accommodation, and a window below the objective lens admitting light to said drum.

3. In a motion picture camera, a viewer having an ocular lens and an objective lens forming a final image of a scene to be photographed, a movable counter comprising a translucent drum having indicia showing film footage, means for rotating said drum in synchronism with a film, a separate lens focused at a point on said drum and serving to produce an image of said indicia as they rotate with said drum, said last-mentioned image being in the same plane as the final image of the viewer, so that both images may be seen simultaneously through the ocular lens without eye accommodation, a window below the objective lens admitting light to said drum, and an immovable light baffle within the drum to pass light and form a background for the said indicia.

LEO FRANKEL.

REFERENCES CITED

The following references are of record in the file of this patent:

UNITED STATES PATENTS

| Number | Name | Date |
| --- | --- | --- |
| 1,858,792 | Merle | May 17, 1932 |
| 2,013,288 | Porter | Sept. 3, 1935 |
| 2,249,975 | Nissen | July 22, 1941 |
| 2,294,250 | Sperry | Aug. 25, 1942 |
| 2,346,076 | Mihalyi | Apr. 4, 1944 |

FOREIGN PATENTS

| Number | Country | Date |
| --- | --- | --- |
| 707,804 | France | Apr. 20, 1931 |
| 224,669 | Switzerland | Mar. 1, 1943 |